Patented Nov. 17, 1942

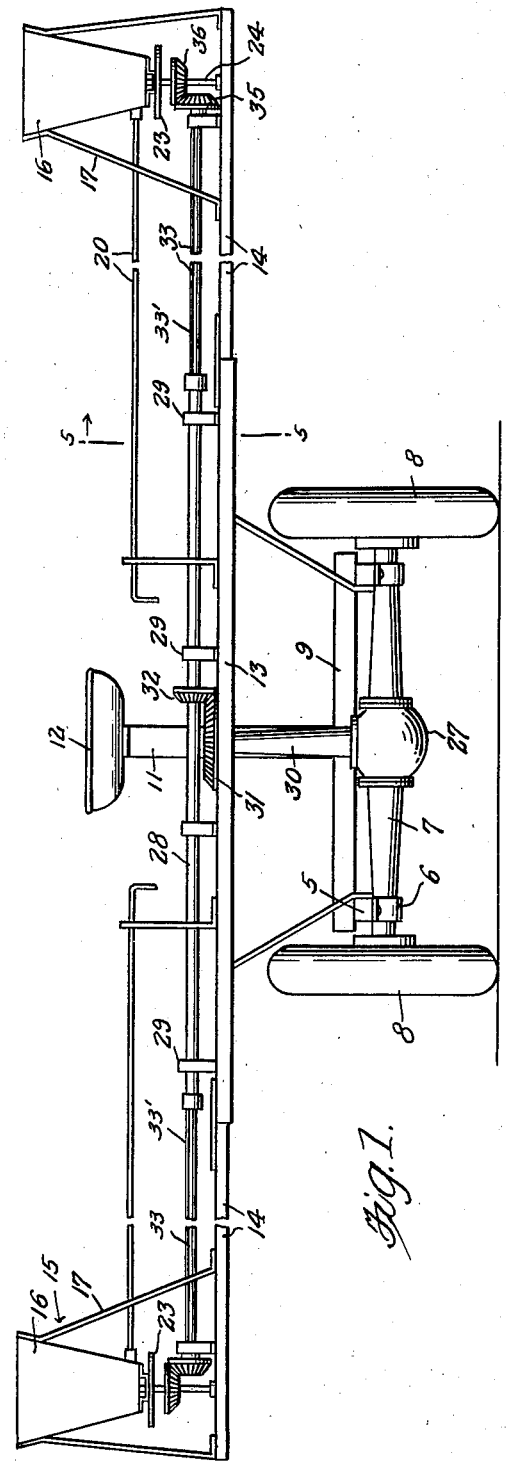
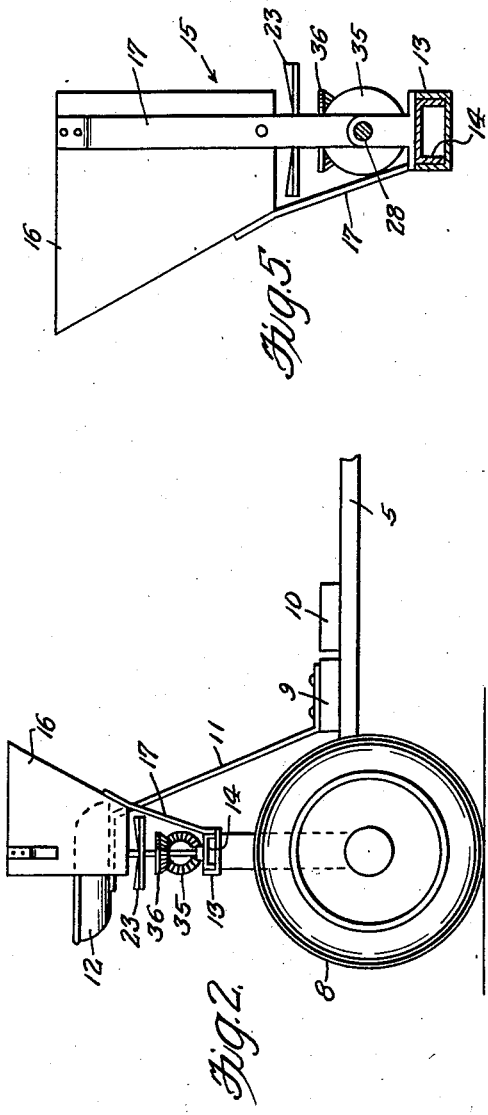

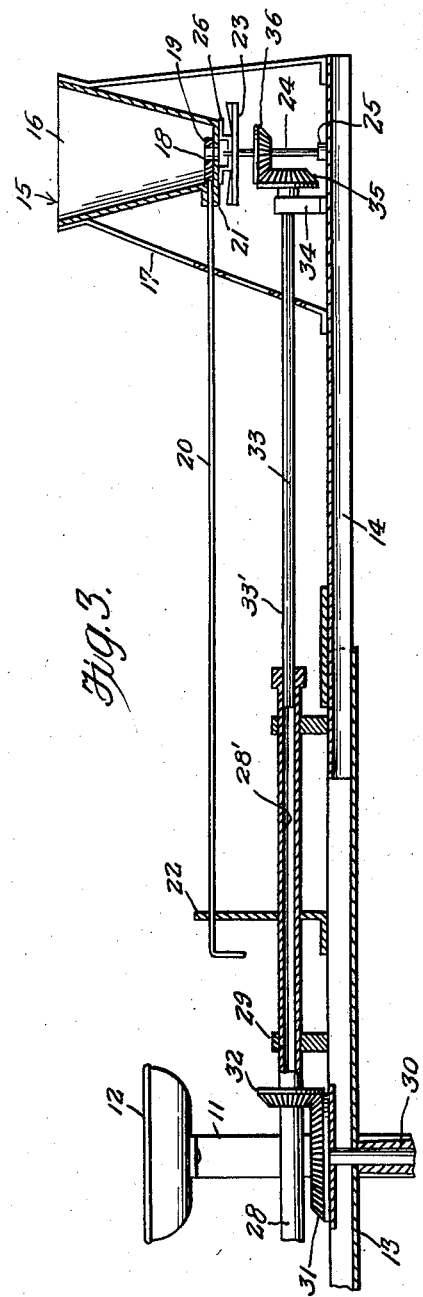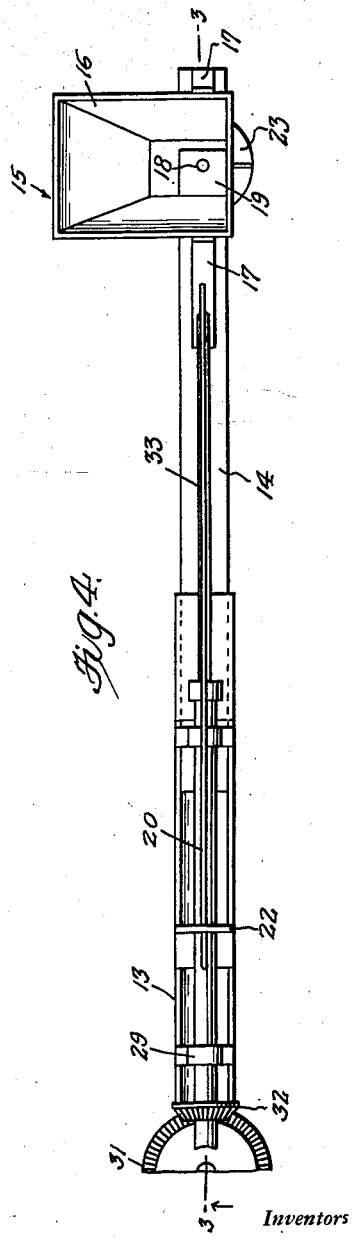

2,302,413

UNITED STATES PATENT OFFICE 2,302,413

SEED SOWER AND FERTILIZER DISTRIBUTOR

Theodore Dexter Blackwelder and Jay Williams Blackwelder, Concord, N. C.

Application May 14, 1941, Serial No. 393,442

2 Claims. (Cl. 275—8)

This invention relates to distributing mechanism, and more particularly to mechanism designed principally for sowing seed and distributing or broadcasting fertilizer as may be found desirable.

An object of the present invention is to provide an improved wheel-supported feed sower and fertilizer distributor such as is adapted to be attached to and propelled by draft means such as a motor vehicle, horse, or the like.

Further, in accordance with the present invention, the device is provided with improved supporting means whereby a pair of distributing mechanisms are mounted for adjustment at opposite sides of the wheel-supported structure laterally toward and away from one another so that when desired the mechanisms may be spaced relative to one another a distance generally referred to as "road width" to permit the device to be drawn over a road or thoroughfare conveniently.

The invention, together with its objects and advantages, will be best understood from a study of the following description taken in connection with the accompanying drawings wherein—

Figure 1 is a rear elevational view of the device.

Figure 2 is a side elevational view thereof.

Figure 3 is a detail sectional view taken substantially on the line 3—3 of Figure 4.

Figure 4 is a top plan view of one of the distributor mechanisms and supporting means therefor, and Figure 5 is a detail sectional view taken substantially on the line 5—5 of Figure 1.

Referring more in detail to the drawings it will be seen that in accordance with the present invention, the main frame may consist of parallel bars 5—5 that at their front ends may be connected in any suitable manner and equipped for attaching the device to a suitable draft appliance, either an animal, or a motor vehicle, as found desirable.

At the rear ends thereof the bars 5—5 have secured thereto through the medium of clamps 6 an axle housing 7 housing an axle on the ends of which are traction wheels 8.

Adjacent the rear ends thereof, and forwardly of the wheels 8, the bars 5—5 are connected by cross cleats 9 and 10.

Secured to and rising from the cleat 9 is a bracket 11 on the upper end of which is a seat 12 for the operator of the mechanism.

Supported above and in parallelism to the axle housing 5 is a channel bar 13, the respective opposite ends of which telescopically receive supporting arms or bars 14 that are channel-shaped in cross-section and disposed with the open sides of the channels facing downwardly for endwise sliding adjustment therein.

At the outer end or free end of each bar or arm 14 is a distributing mechanism 15.

Each mechanism 15 embodies a hopper 16 supported on the associated arm 14 through the medium of brackets 17, and in the bottom thereof the hopper 16 is provided with a discharge opening 18 controlled by a slide valve 19.

The valve 19 has an operating handle or rod 20 extending therefrom and working through a guide boss 21 provided therefor at one side of the hopper, and through a guide bracket 22 rising from the member 13 at one side of the seat 12. It will thus be seen that the operator occupying the seat 12 may readily grasp the rod 20 for shifting the valve 19 to open and closed position with respect to the discharge opening 18 of the hopper.

Further, each distributing, or broadcasting mechanism 15 embodies a spreader disk 23 disposed beneath the bottom of the hopper 16 to receive the contents of the hopper for spreading or broadcasting such discharged contents.

The disk 16 is mounted on a vertical shaft 24 journaled in bearings 25 and 26 as shown.

In accordance with the present invention the wheel axle has associated therewith a conventional differential housed within a housing 27 associated with the axle housing 7 and drive is transmitted from the axle through the differential driving mechanism to a center shaft section 28 journaled in suitable bearing brackets 29 provided therefor on the bar 13.

The drive from the differential driving mechanism within the housing 27 is transmitted to the shaft 28 through the medium of a shaft (see Fig. 1) housed within a vertical housing 30 that extends upwardly from the differential housing 27 to the member 13 and on which shaft is a bevel gear 31 meshing with a bevel gear 32 on the shaft 28.

The shaft 28 at its respective opposite ends telescopically accommodate shaft sections 33, there being one shaft section 33 for each distributor mechanism 15.

Each shaft section 33 has one end thereof journaled in a suitable bearing 34 provided therefor in proximity to a shaft 24, and at said end is equipped with a bevel gear 35 that is in mesh with a bevel gear 36 on the adjacent shaft 24.

The shaft section 28 is provided internally with ways as at 28' extending longitudinally thereof, while the shaft sections 33 are provided with keys as at 33' lengthwise thereof engaging in the ways so that shafts 33 will turn with the shaft 28.

It will thus be seen that as the device moves over the ground, drive from the wheels 8 will be transmitted through the axle, the differential drive mechanism, and gearing 31, 32, to the shaft 28, and through the medium of the shaft 28, and the associated shaft sections 33 to the vertical shafts 24 of the respective distributing mechanisms to revolve the spreading disks 23 of such mechanisms.

By adjusting the arms or bars 14, the described distributing mechanism 16 may be correspondingly adjusted laterally of the machine to distribute in different paths, while at the same time, the shaft sections 33 under such adjustment of said mechanisms may be slidably adjusted in the shaft 28 thus maintaining the driving connection to the spreader disks 23.

Obviously as the disks 23 revolve, the contents of the hoppers 16, passing through the discharge openings 18 onto the disks, will be thrown outwardly from the disks by centrifugal force so as to be broadcast over the ground.

It will be appreciated that a device of this character acts in the nature of a trailer vehicle which may be readily coupled to a draft appliance, and can be used to advantage for sowing seed, spreading manure or fertilizer, or for the spreading of any desired material.

While we have herein illustrated and described a preferred embodiment of the invention, it will be understood that we do not confine ourselves to the precise details of construction, combination and arrangement of elements as herein illustrated and described, as we fully appreciate that minor changes may be made therein during the use of the device by one skilled in the art.

Having thus described the invention what is claimed as new is:

1. In a device for sowing seed and spreading materials, a trailer vehicle embodying a frame, an axle housing mounted on the frame, traction wheels mounted on the opposite ends of the axle, a channel bar mounted above the axle in parallelism therewith, arms slidably engaged with said channel bar at the respective opposite ends of said channel bar, and extensible and retractible longitudinally with respect to said channel bar, material-distributing mechanisms mounted on said arms at the free ends of the latter, and driving mechanism connected with the axle and said distributing mechanisms for transmitting drive from the axle to said distributing mechanisms, said driving mechanism including a driven shaft rotatably supported on said channel member, and shaft sections telescopically engaged with the respective opposite ends of said driven shaft and having driving connections with said distributor mechanisms, said shaft sections being extensible and retractible with respect to said driven shaft section in response to the extension and retraction of said arms.

2. In a device for sowing seed and spreading materials, a trailer vehicle embodying a frame, an axle housing mounted on the frame, traction wheels mounted on the opposite ends of the axle, a channel bar mounted above the axle in parallelism therewith, arms slidably engaged with said channel bar at the respective opposite ends of said channel bar, and extensible and retractible longitudinally with respect to said channel bar, material-distributing mechanisms mounted on said arms at the free ends of the latter, and driving mechanism connected with the axle and said distributing mechanisms for transmitting drive from the axle to said distributing mechanisms and including a differential driven by said axle and operatively connected to the material distributing mechanisms; a seat mounted on said frame, and each of said distributor mechanisms including a hopper having a discharge opening and a slide valve for said opening, said valve having an operating rod extending therefrom and terminating adjacent to said seat at one side of the latter for convenient manipulation by the occupant of the seat.

THEODORE DEXTER BLACKWELDER.
JAY WILLIAMS BLACKWELDER.